(12) United States Patent
Furukawa et al.

(10) Patent No.: US 11,232,912 B2
(45) Date of Patent: *Jan. 25, 2022

(54) SOLID ELECTROLYTIC CAPACITOR

(71) Applicant: Murata Manufacturing Co., Ltd., Nagaokakyo (JP)

(72) Inventors: Takeshi Furukawa, Nagaokakyo (JP); Yasuhiro Tamatani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 16/815,253

(22) Filed: Mar. 11, 2020

(65) Prior Publication Data
US 2020/0303130 A1  Sep. 24, 2020

(30) Foreign Application Priority Data
Mar. 22, 2019 (JP) .............................. JP2019-054614

(51) Int. Cl.
*H01G 9/012* (2006.01)
*H01G 9/048* (2006.01)
(Continued)

(52) U.S. Cl.
CPC ............. *H01G 9/048* (2013.01); *H01G 9/012* (2013.01); *H01G 9/15* (2013.01); *H01G 2009/05* (2013.01)

(58) Field of Classification Search
None
See application file for complete search history.

(56) References Cited

U.S. PATENT DOCUMENTS 6,392,869 B2  5/2002  Shiraishi et al.
6,563,693 B2  5/2003  Nakada et al.
(Continued)

FOREIGN PATENT DOCUMENTS

CN  101162654 A  4/2008
JP  H05101989 A  4/1993
(Continued)

OTHER PUBLICATIONS

Chinese Office Action issued for Chinese Application No. 202010179353.8, dated Aug. 3, 2021.
(Continued)

*Primary Examiner* — Dion R. Ferguson
(74) *Attorney, Agent, or Firm* — Arent Fox LLP

(57) ABSTRACT

A solid electrolytic capacitor that includes a capacitor element laminate, a first external electrode, and a second external electrode. The capacitor element laminate includes capacitor elements, cathode lead-out layers, and a sealing body. At least one capacitor element includes an anode foil, dielectric layers, and cathode layers. The first external electrode is connected to the anode foil exposed at the first end surface of the capacitor element laminate. The second external electrode is connected to the cathode lead-out layers exposed at the second end surface of the capacitor element laminate. A first cathode lead-out layer and a second cathode lead-out layer are both conductive paste layers, and uniformly extend from where the first cathode lead-out layer and the second cathode lead-out layer are disposed on the cathode layers to the second external electrode.

13 Claims, 9 Drawing Sheets

(51) Int. Cl.
   *H01G 9/15* (2006.01)
   *H01G 9/04* (2006.01)

(56) References Cited

U.S. PATENT DOCUMENTS

| | | | |
|---|---|---|---|
| 7,385,804 B2 | 6/2008 | Kuriyama | |
| 2002/0001169 A1* | 1/2002 | Shiraishi | H01G 9/012 361/523 |
| 2004/0027789 A1 | 2/2004 | Koichi et al. | |
| 2004/0264111 A1 | 12/2004 | Shimoyama et al. | |
| 2007/0279841 A1* | 12/2007 | Kim | H01G 9/08 361/540 |
| 2007/0297121 A1 | 12/2007 | Yoshida et al. | |
| 2008/0089014 A1 | 4/2008 | Ishizuka et al. | |
| 2008/0304210 A1 | 12/2008 | Kasuga et al. | |
| 2009/0089990 A1* | 4/2009 | Kawakubo | H01G 9/0029 29/25.03 |
| 2010/0165547 A1 | 7/2010 | Kuranuki et al. | |
| 2012/0125674 A1 | 5/2012 | Miyahara et al. | |
| 2013/0100586 A1 | 4/2013 | Kitayama et al. | |
| 2017/0040117 A1* | 2/2017 | Shin | H01G 9/012 |
| 2017/0140877 A1 | 5/2017 | Kuromi | |
| 2017/0287647 A1 | 10/2017 | Nobuta et al. | |
| 2017/0365419 A1 | 12/2017 | Demizu et al. | |
| 2019/0006115 A1 | 1/2019 | Uher et al. | |
| 2019/0237266 A1 | 8/2019 | Tsutsumi | |
| 2019/0244765 A1* | 8/2019 | Harada | H01G 9/045 |
| 2020/0211784 A1* | 7/2020 | Tamatani | H01G 9/045 |
| 2020/0273628 A1* | 8/2020 | Suzuki | H01G 9/15 |
| 2020/0303130 A1 | 9/2020 | Furukawa et al. | |
| 2020/0303131 A1* | 9/2020 | Furukawa | H01G 9/10 |

FOREIGN PATENT DOCUMENTS

| | | |
|---|---|---|
| JP | 2002319522 A | 10/2002 |
| JP | 2003086459 A | 3/2003 |
| JP | 2005026257 A | 1/2005 |
| JP | 2007180160 A | 7/2007 |
| JP | 2008078312 A | 4/2008 |
| WO | 2018074407 A1 | 4/2018 |
| WO | 2018074408 A1 | 4/2018 |
| WO | 2018235408 A1 | 12/2018 |

OTHER PUBLICATIONS

Japanese Office Action issued for Japanese Application No. 2019-054614, date of Japanese Office Action dated Nov. 2, 2021.

* cited by examiner

SOLID ELECTROLYTIC CAPACITOR

CROSS REFERENCE TO RELATED APPLICATIONS

The present application claims priority to Japanese Patent Application No. 2019-054614, filed Mar. 22, 2019, the entire contents of which are incorporated herein by reference.

FIELD OF THE INVENTION

The present invention relates to a solid electrolytic capacitor.

BACKGROUND OF THE INVENTION

Patent Literature 1 (WO 2018/074408) discloses a solid electrolytic capacitor including a stack of multiple units each including a valve-action metal substrate having a porous layer on a surface, a dielectric layer on a surface of the porous layer, and a solid electrolyte layer on the dielectric layer, wherein a conductor layer is disposed between the units, at least one conductor layer includes metal foil, the units and the conductor layers are enclosed in an exterior resin, an end surface on an anode side of the valve-action metal substrate is directly connected to an anode external electrode on a surface of the exterior resin at one end surface of the solid electrolytic capacitor, and the metal foil is directly connected to a cathode external electrode on a surface of the exterior resin at the other end surface of the solid electrolytic capacitor.

SUMMARY OF INVENTION

The solid electrolytic capacitor disclosed in Patent Literature 1 uses metal foil as the cathode lead-out layers. The metal foil does not have a capacitor function, so that the effective volume of the capacity as a whole is small. Also, the production of the solid electrolytic capacitor disclosed in Patent Literature 1 requires processing metal foil, which tends to complicate the production process.

The present invention is made to solve the above problems, and aims to provide a highly reliable solid electrolytic capacitor having a structure with low resistance, which can be produced at low cost.

The solid electrolytic capacitor of the present invention includes a capacitor element laminate, a first external electrode at a first end surface of the capacitor element laminate, and a second external electrode at a second end surface of the capacitor element laminate. The capacitor element laminate includes capacitor elements, cathode lead-out layers, and a sealing body enclosing the capacitor elements and the cathode lead-out layers. At least one of the capacitor elements includes an anode foil made of a valve-action metal, dielectric layers on opposed surfaces of the anode foil, and cathode layers including a solid electrolyte layer on surfaces of each of the dielectric layers. The cathode layers are connected to respective cathode lead-out layers. The first external electrode is connected to the anode foil exposed at the first end surface of the capacitor element laminate. The second external electrode is connected to the respective cathode lead-out layers exposed at the second end surface of the capacitor element laminate. The respective cathode lead-out layers include a first cathode lead-out layer on an upper surface of the capacitor element and a second cathode lead-out layer on a lower surface of the capacitor element. The first cathode lead-out layer and the second cathode lead-out layer are both conductive paste layers, and uniformly extend from where the first cathode lead-out layer and the second cathode lead-out layer are disposed on the cathode layers to the second external electrode. The first cathode lead-out layer and the second cathode lead-out layer exposed at the second end surface of the capacitor element laminate are insulated from the anode foil.

The present invention provides a highly reliable solid electrolytic capacitor having a structure with low resistance, which can be produced at low cost.

DETAILED DESCRIPTION OF THE PREFERRED EMBODIMENTS

Figure 1:
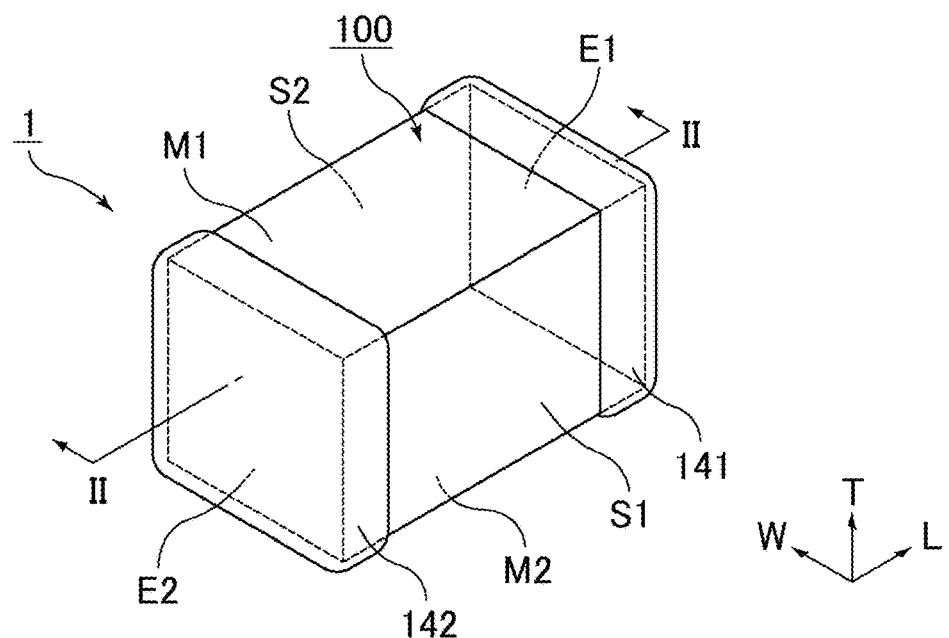
FIG. 1 is a schematic perspective view of an example of a solid electrolytic capacitor according to a first embodiment of the present invention.

The solid electrolytic capacitor of the present invention is described below.

The present invention is not limited to the following preferred embodiments, and may be suitably modified without departing from the gist of the present invention. Combinations of two or more preferred features described in the following preferred features are also within the scope of the present invention.

In the solid electrolytic capacitor of the present invention, the cathode lead-out layers include a first cathode lead-out layer on an upper surface of the capacitor element and a second cathode lead-out layer on a lower surface of the capacitor element; the first cathode lead-out layer and the second cathode lead-out layer are both conductive paste layers, and uniformly extend to the second external electrode; and the first cathode lead-out layer and the second cathode lead-out layer exposed at the second end surface of the capacitor element laminate are insulated from the anode foil.

In the solid electrolytic capacitor of the present invention, since the cathode lead-out layers are conductive paste layers, use of metal foil as the cathode lead-out layers is no longer required. Thus, the solid electrolytic capacitor can be produced at low cost. Since the metal foil is not required, there are fewer interfaces between different materials of a conductive path leading to the second external electrode. Thus, the resulting structure has low resistance.

Further, since the first cathode lead-out layer is disposed on the upper surface of the capacitor element and the second cathode lead-out layer is disposed on the lower surface of the capacitor element, influence of environmental exposure can be blocked. Thus, the solid electrolytic capacitor has higher reliability.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment.

First Embodiment

In the solid electrolytic capacitor according to the first embodiment of the present invention, metal foil exposed at the second end surface of the capacitor element laminate is disposed in a space where the capacitor element is not present between the first cathode lead-out layer and the second cathode lead-out layer. The metal foil is a portion separated from the anode foil by a slit, and is completely insulated from the anode foil.

In the solid electrolytic capacitor according to the first embodiment of the present invention, the metal foil separated from the anode foil is used directly as a support portion of the cathode lead-out layers. Thus, there is no difference in the linear expansion coefficient, and structural strain or cracking that may occur when the solid electrolytic capacitor is heated can be prevented or reduced.

FIG. 1 is a schematic perspective view of an example of a solid electrolytic capacitor according to a first embodiment of the present invention.

A solid electrolytic capacitor 1 shown in FIG. 1 includes a capacitor element laminate 100, a first external electrode 141, and a second external electrode 142.

In FIG. 1, the length direction of the solid electrolytic capacitor 1 or the capacitor element laminate 100 is indicated by L, the width direction thereof is indicated by W, and the thickness direction thereof is indicated by T. Here, the length direction L, the width direction W, and the thickness direction T are perpendicular to each other. A plane along the length direction L and the thickness direction T of the solid electrolytic capacitor 1 or the capacitor element laminate 100 is referred to as an LT plane; a plane along the length direction L and the width direction W thereof is referred to as an LW plane; and a plane along the width direction W and the thickness direction T thereof is referred to as a WT plane.

The outer shape of the capacitor element laminate 100 is a rectangular parallelepiped. The capacitor element laminate 100 includes a first end surface E1 and a second end surface E2 opposite to each other in the length direction L, a first lateral surface S1 and a second lateral surface S2 opposite to each other in the width direction W, and a first main surface M1 and a second main surface M2 opposite to each other in the thickness direction T. The first end surface E1 and the second end surface E2 are WT planes, the first lateral surface S1 and the second lateral surface S2 are LT planes, and the first main surface M1 and the second main surface M2 are LW planes. In the present embodiment, the second main surface M2 is a bottom of the capacitor element laminate 100, and is a side that defines a mounting surface of the solid electrolytic capacitor 1.

In the capacitor element laminate 100, corners and edges may be rounded. The corner is a portion where three surfaces of the capacitor element laminate 100 meet, and the edge is a portion where two surfaces of the capacitor element laminate 100 meet.

The first external electrode 141 is provided at the first end surface E1 of the capacitor element laminate 100. In the present embodiment, the first external electrode 141 extends to a portion of the first main surface M1, a portion of the second main surface M2, a portion of the first lateral surface S1, and a portion of the second lateral surface S2 of the capacitor element laminate 100. The first external electrode 141 may not extend to a portion of the first main surface M1 of the capacitor element laminate 100. For example, the first external electrode 141 provided at the first end surface E1 may extend to a portion of the second main surface M2.

The second external electrode 142 is provided at the second end surface E2 of the capacitor element laminate 100. In the present embodiment, the second external electrode 142 extends to a portion of the first main surface M1, a portion of the second main surface M2, a portion of the first lateral surface S1, and a portion of the second lateral surface S2 of the capacitor element laminate 100. The second external electrode 142 may not extend to a portion of the first main surface M1 of the capacitor element laminate 100. For example, the second external electrode 142 provided at the second end surface E2 may extend to a portion of the second main surface M2.

Figure 2:
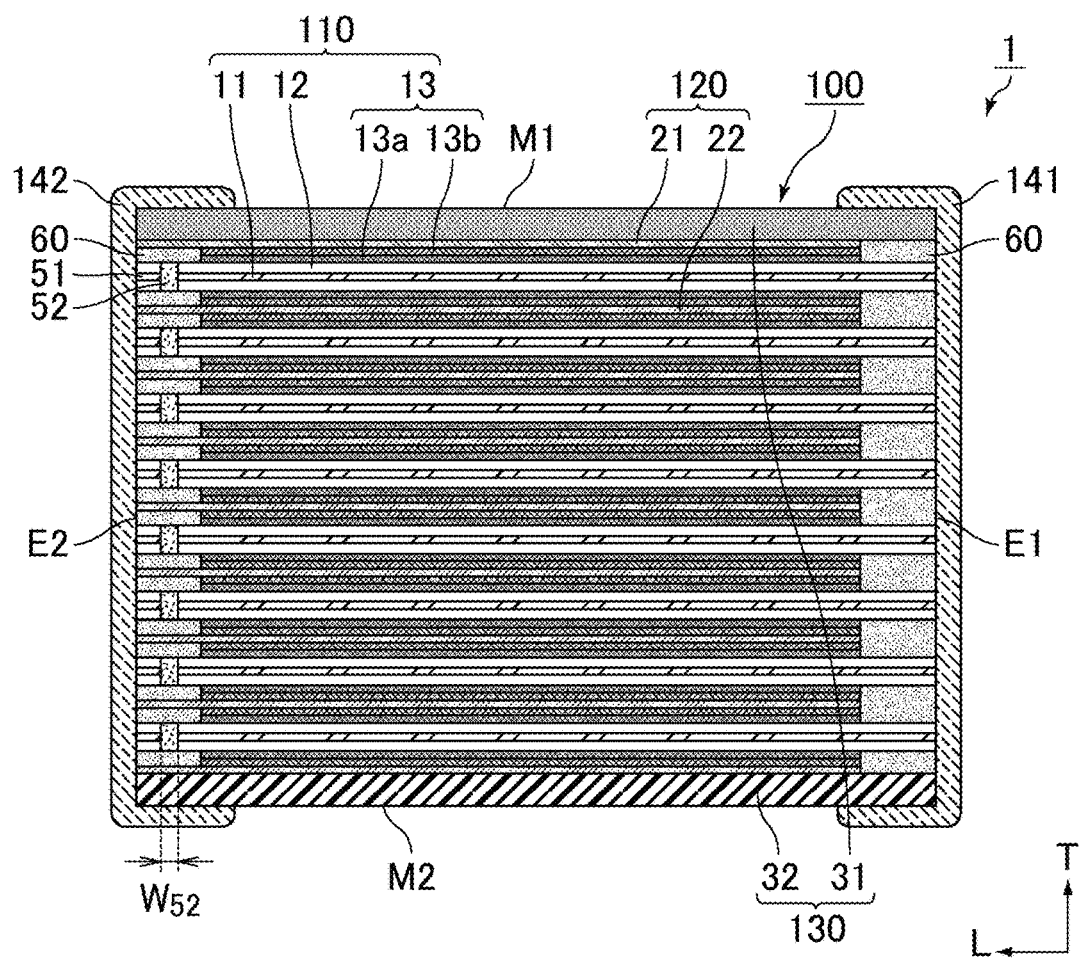
FIG. 2 is a cross-sectional view taken along the line II-II of the solid electrolytic capacitor shown in FIG. 1.
Figure 3:
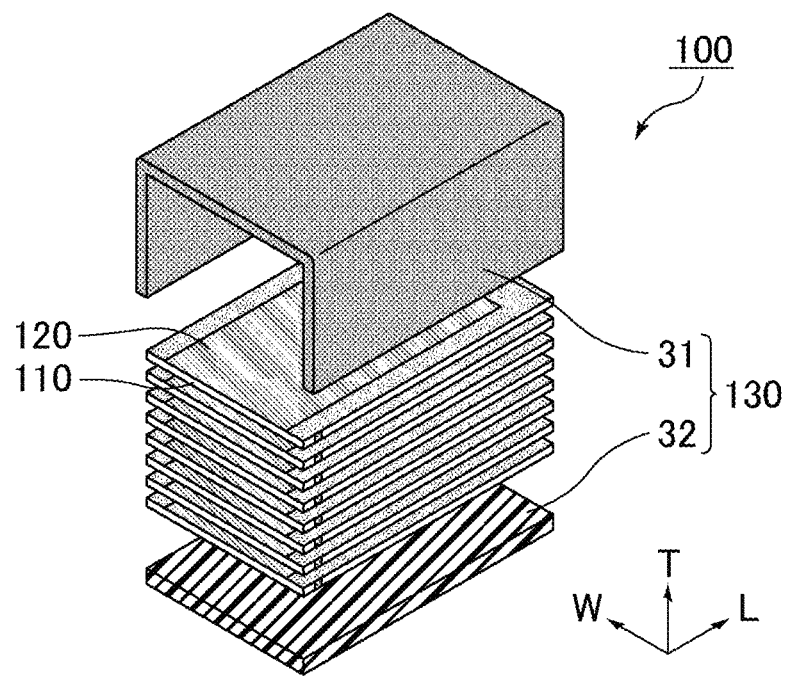
FIG. 3 is an exploded perspective view of a capacitor element laminate defining the solid electrolytic capacitor shown in FIG. 1.

FIG. 2 is a cross-sectional view taken along the line II-II of the solid electrolytic capacitor shown in FIG. 1. FIG. 2 is an LT cross-sectional view of the solid electrolytic capacitor 1. FIG. 3 is an exploded perspective view of a capacitor element laminate defining the solid electrolytic capacitor shown in FIG. 1.

As shown in FIG. 2 and FIG. 3, the capacitor element laminate 100 includes capacitor elements 110, cathode lead-out layers 120, and a sealing body 130. In FIG. 2 and FIG. 3, the capacitor elements 110 and the cathode lead-out layers 120 are stacked in the thickness direction T. The sealing body 130 encloses the capacitor elements 110 and the cathode lead-out layers 120.

Each capacitor element 110 includes an anode foil 11, a dielectric layer 12, and a cathode layer 13. The cathode layers 13 of the capacitor element 110 are connected to the respective cathode lead-out layers 120.

The anode foil 11 includes a core portion and a porous portion on a surface of the core portion. The anode foil 11 includes the dielectric layer 12 on a surface of the porous portion. Preferably, the anode foil 11 includes a porous portion on both surfaces of the core portion.

The anode foil 11 is made of a valve-action metal that functions as a valve. Examples of the valve-action metal include elemental metals such as aluminum, tantalum, niobium, titanium, zirconium, and alloys containing at least one of these metals. Of these, aluminum and an aluminum alloy are preferred.

The porous portion of the anode foil 11 may be an etched layer formed on a surface of the anode foil 11, or a porous layer printed and sintered on the surface of the anode foil 11. When the valve-action metal is aluminum or an aluminum alloy, an etched layer can be formed on the surface by etching with hydrochloric acid or the like.

The thickness of the anode foil 11 before etching is preferably 60 µm to 200 µm. The thickness of the non-etched core portion after etching is preferably 15 µm to 70 µm. The thickness of the porous portion is designed according to the withstand voltage and capacitance required. Yet, the total thickness of the porous portions on both sides of the core portion is preferably 10 µm to 180 µm.

The dielectric layer 12 is provided on the surface of the porous portion of the anode foil 11. The dielectric layer 12 is formed along the surface of the porous portion, and thus includes pores (recesses).

The dielectric layer 12 is preferably made of an oxide film of the valve-action metal. For example, when an aluminum foil is used as the anode foil 11, the surface of the aluminum foil is anodized (chemically treated) in an aqueous solution containing ammonium adipate or the like, whereby the dielectric layer 12 made of an oxide film can be formed.

The thickness of the dielectric layer 12 is designed according to the withstand voltage and capacitance required, but it is preferably 10 nm to 100 nm.

The cathode layer 13 is provided on the surface of the dielectric layer 12. The cathode layer 13 includes a solid electrolyte layer 13a on the surface of the dielectric layer 12. Preferably, the cathode layer 13 further includes a carbon layer 13b on a surface of the solid electrolyte layer 13a.

Examples of materials of the solid electrolyte layer 13a include conductive polymers such as polypyrroles, polythiophenes, and polyanilines. Of these, polythiophenes are preferred, and poly(3,4-ethylenedioxythiophene) (PEDOT) is particularly preferred. Examples of the conductive polymers may also include dopants such as poly(styrene sulfonate) (PSS).

The solid electrolyte layer 13a is formed by, for example, a method in which a treatment solution containing a monomer such as 3,4-ethylenedioxythiophene is used to form a polymerized film of poly(3,4-ethylenedioxythiophene) or the like on the surface of the dielectric layer 12, or a method in which a dispersion of a polymer such as poly(3,4-ethylenedioxythiophene) is applied to the surface of the dielectric layer 12 and drying the dispersion. Preferably, the solid electrolyte layer 13a is formed by first forming an inner layer filling the pores (recesses) in the dielectric layer 12 and then forming an external layer covering the dielectric layer 12.

The solid electrolyte layer 13a can be formed in a predetermined region by applying the treatment solution or dispersion to the dielectric layer 12 by, for example, sponge transfer, screen printing, inkjet printing, or using a dispenser. The thickness of the solid electrolyte layer 13a is preferably 2 µm to 20 µm.

The carbon layer 13b is provided to electrically and mechanically interconnect the solid electrolyte layer 13a and the cathode lead-out layer 120.

The carbon layer 13b can be formed in a predetermined region by applying a carbon paste to the solid electrolyte layer 13a by, for example, sponge transfer, screen printing, inkjet printing, or using a dispenser. Preferably, the cathode lead-out layers 120 in the subsequent step are stacked while the carbon layer 13b is viscous before drying. The thickness of the carbon layer 13b is preferably 2 µm to 20 µm.

The cathode lead-out layers 120 include a first cathode lead-out layer 21 on an upper surface of the capacitor element 110, and a second cathode lead-out layer 22 on a lower surface of the capacitor element 110. The first cathode lead-out layer 21 and the second cathode lead-out layer 22 are separately disposed in one capacitor element 110, and are not connected to each other. At an outermost surface in the thickness direction T (i.e., an outermost surface parallel to the LW plane), the first cathode lead-out layer 21 or the second cathode lead-out layer 22 faces the sealing body 130.

The first cathode lead-out layer 21 and the second cathode lead-out layer 22 are both conductive paste layers.

Each conductive paste layer can be formed in a predetermined region by applying a conductive paste to the cathode layer 13 by, for example, sponge transfer, screen printing, inkjet printing, or using a dispenser. The conductive paste is preferably one mainly containing silver, copper, or nickel. In the case of screen printing, a conductive paste layer having a thickness of 2 µm to 20 µm can be made.

Herein, the conductive paste layers encompass not only layers formed by curing or drying a conductive paste but also layers formed by sintering a conductive paste. Thus, the conductive paste layers also encompass, for example, an electrode layer formed from a metal nanoparticle paste such as a silver nanoparticle paste.

The first cathode lead-out layer 21 and the second cathode lead-out layer 22 both uniformly extend from where the first cathode lead-out layer 21 and the second cathode lead-out layer 22 are disposed on the cathode layers 13 to the second external electrode 142. The first cathode lead-out layer 21 and the second cathode lead-out layer 22 exposed at the second end surface E2 of the capacitor element laminate 100 are insulated from the anode foil 11.

In the first embodiment of the present invention, a metal foil 51 exposed at the second end surface E2 of the capacitor element laminate 100 is provided in a space where the capacitor elements 110 is not present between the first cathode lead-out layer 21 and the second cathode lead-out layer 22.

The metal foil 51 is a portion separated from the anode foil 11 by a slit SL described later (see FIG. 7), and is completely insulated from the anode foil 11. The metal foil 51 is electrically insulated from the anode foil 11, but these are originally the same layer. Thus, the metal foil 51 includes the dielectric layer 12 on the surface.

Preferably, an insulating portion 52 filling the slit SL is provided between the metal foil 51 and the anode foil 11. An insulating material of the insulating portion 52 includes at least a resin, preferably a resin and a filler. Examples of the resin include epoxy resins and phenol resins. Examples of the filler include silica particles, alumina particles, and metal particles.

The width of the insulating portion 52 (the length indicated by $W_{52}$ in FIG. 2) is, for example, 30 µm to 150 µm.

In an example shown in FIG. 2, insulating layers 60 are provided between the first cathode lead-out layer 21 and the metal foil 51 and between the second cathode lead-out layer 22 and the metal foil 51. The insulating layers 60 are also provided between the capacitor elements 110. Each insulating layer 60 may include a single layer or multiple layers. For example, each insulating layer 60 includes a mask layer 61 described later (see FIG. 8) and an insulating adhesive layer 62 on a surface of the mask layer 61 (see FIG. 12). The insulating layers 60 may not be provided at the portions described above, or resin molded bodies instead of the insulating layers 60 may be provided at the portions described above.

The mask layer 61 is formed by, for example, applying a masking material made of an insulating material such as an insulating resin to the surface of the anode foil 11 and solidifying or curing the masking material by heat or the like. The masking material is preferably applied by, for example, screen printing, inkjet printing, or using a dispenser.

Examples of the insulating material of the masking material include insulating resins such as polyphenylsulfone resin, polyethersulfone resin, cyanate ester resin, fluorine resins (e.g., tetrafluoroethylene and tetrafluoroethylene-perfluoroalkyl vinyl ether copolymer), compositions containing a soluble polyimide siloxane and an epoxy resin, polyimide resin, polyamideimide resin, and derivatives or precursors thereof.

The insulating adhesive layer 62 is formed by, for example, applying an insulating material such as an insulating resin to the mask layer 61 and solidifying or curing the masking material by heat or the like. The insulating material is preferably applied by, for example, screen printing, inkjet printing, or using a dispenser.

Components and the viscosity of the insulating adhesive layer 62 may be the same as those of the mask layer 61, but are preferably different from those of the mask layer 61.

In the first embodiment of the present invention, the insulating portion 52 may extend to at least one of an upper surface or a lower surface of the anode foil 11. In this case, another insulating layer may be provided between the anode foil 11 and the insulating portion 52 extending to the upper surface or the lower surface of the anode foil 11.

Similarly, the insulating portion 52 may extend to at least one of an upper surface or a lower surface of the metal foil 51. In this case, another insulating layer may be provided between the metal foil 51 and the insulating portion 52 extending to the upper surface or the lower surface of the metal foil 51.

An insulating layer is provided between the anode foil and the cathode lead-out layer (conductive paste layer) or between the metal foil and the cathode lead-out layer, whereby the difference in the linear expansion coefficient between the cathode lead-out layer and the anode foil or the metal foil can be adjusted.

Figure 4:
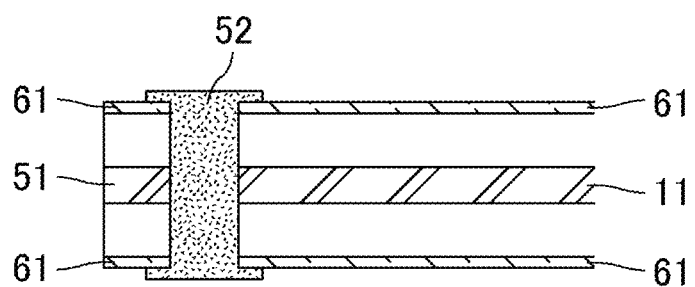
FIG. 4 is a schematic cross-sectional view of an example of another insulating portion.

FIG. 4 is a schematic cross-sectional view of an example of another insulating portion.

In an example shown in FIG. 4, the insulating portion 52 extends to the upper surface and the lower surface of the anode foil 11. The mask layer 61 as another insulating layer is provided between the anode foil 11 and the insulating portion 52 extending to the upper surface and the lower surface of the anode foil 11. Similarly, the insulating portion 52 extends to the upper surface and the lower surface of the metal foil 51. The mask layer 61 is provided between the metal foil 51 and the insulating portion 52 extending to the upper surface and the lower surface of the metal foil 51.

The capacitor elements 110 and the cathode lead-out layers 120 are enclosed in the sealing body 130. In examples shown in FIG. 2 and FIG. 3, the sealing body 130 includes a resin molded body 31 and a support board 32.

An insulating material of the resin molded body 31 includes at least a resin, preferably a resin and a filler. Examples of the resin include epoxy resins and phenol resins. Examples of the filler include silica particles, alumina particles, and metal particles.

The resin molded body 31 can be formed by a method that uses a resin mold such as a compression mold or a transfer mold. For example, a compression mold is used to enclose a stack of the capacitor elements 110 and the cathode lead-out layers 120.

The support board 32 is provided on the bottom to integrate the stack of the capacitor elements 110 and the cathode lead-out layers 120. The support board 32 is preferably a glass epoxy board. The sealing body 130 may not include the support board 32. In such a case, the sealing body 130 may include a resin molded body also on the bottom.

The first external electrode 141 is connected to the anode foil 11 exposed at the first end surface E1 of the capacitor element laminate 100.

The second external electrode 142 is connected to the cathode lead-out layers 120 exposed at the second end surface E2 of the capacitor element laminate 100.

The first external electrode 141 and the second external electrode 142 can be formed by, for example, plating, sputtering, immersion coating, or printing. In the case of plating, a plating layer may be, for example, a Zn·Ag·Ni layer, a Ag·Ni layer, a Ni layer, a Zn·Ni·Au layer, a Ni·Au layer, a Zn·Ni·Cu layer, or a Ni·Cu layer. Preferably, additional plating layers including a Cu plating layer, a Ni plating layer, and a Sn plating layer in the stated order (or without one or some of these layers) are formed on the above plating layers.

Second Embodiment

In a solid electrolytic capacitor according to the second embodiment of the present invention, an insulating layer fills a space where the capacitor element is not present between the first cathode lead-out layer and the second cathode lead-out layer.

In the solid electrolytic capacitor according to the second embodiment of the present invention, the insulating layer and the resin molded body may be formed of different insulating materials, or may be formed of the same insulating material.

When the insulating layer and the resin molded body are made of different insulating materials, the insulating layer can be imparted with a function that improves reliability (e.g., low moisture permeability or stress relaxing ability) by appropriately selecting an insulating material to make the insulating layer.

In contrast, when the insulating layer and the resin molded body are made of the same insulating material, there is no difference in the linear expansion coefficient between the insulating layer and the resin molded body because the insulating material is the same, and structural strain or cracking that may occur when the solid electrolytic capacitor is heated can be prevented or reduced.

Figure 5:
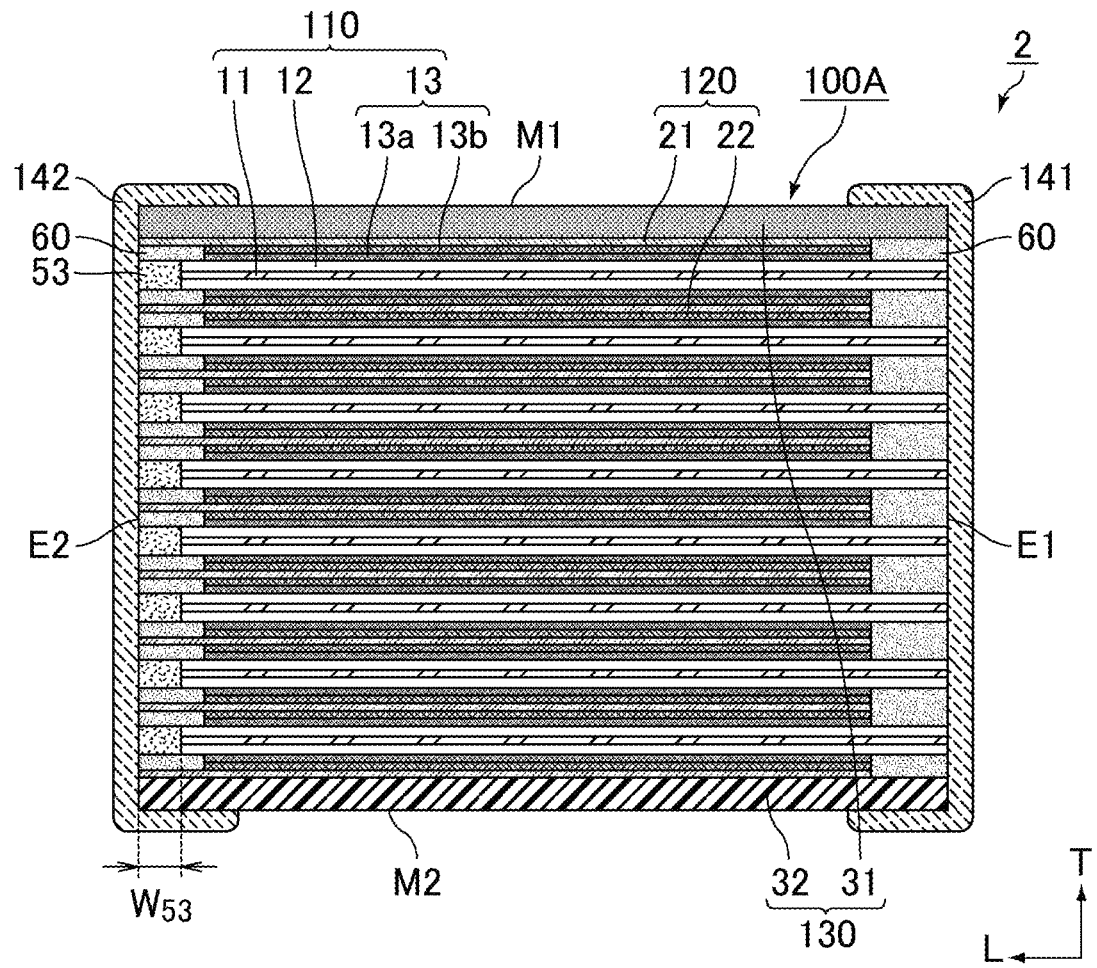
FIG. 5 is a schematic cross-sectional view of an example of a solid electrolytic capacitor according to a second embodiment of the present invention.

FIG. 5 is a schematic cross-sectional view of an example of a solid electrolytic capacitor according to a second embodiment of the present invention.

A solid electrolytic capacitor 2 shown in FIG. 5 includes a capacitor element laminate 100A, the first external electrode 141, and the second external electrode 142. The structures of the first external electrode 141 and the second external electrode 142 are as described in the first embodiment.

The capacitor element laminate 100A includes the capacitor elements 110, the cathode lead-out layers 120, and the sealing body 130. The structures of each capacitor element 110, each cathode lead-out layer 120, and the sealing body 130 are as described for the first embodiment.

In the second embodiment of the present invention, an insulating layer 53 fills a space where the capacitor elements 110 is not present between the first cathode lead-out layer 21 and the second cathode lead-out layer 22.

An insulating material of the insulating layer 53 includes at least a resin, preferably a resin and a filler. Examples of the resin include epoxy resins and phenol resins. Examples of the filler include silica particles, alumina particles, and metal particles.

In the second embodiment of the present invention, the insulating layer 53 and the resin molded body 31 may be formed of different insulating materials, or may be formed of the same insulating material.

In an example shown in FIG. 5, other insulating layers 60 are provided between the first cathode lead-out layer 21 and the insulating layer 53. The insulating layers 60 are also provided between the capacitor elements 110. Each insulating layer 60 may include a single layer or multiple layers. For example, each insulating layer 60 includes the mask layer 61 and the insulating adhesive layer 62 on the surface of the mask layer 61. The insulating layers 60 may not be provided.

In the second embodiment of the present invention, the insulating layer 53 may extend to at least one of the upper surface or the lower surface of the anode foil 11. In this case, another insulating layer may be provided between the anode foil 11 and the insulating portion 53 extending to the upper surface or the lower surface of the anode foil 11.

Method of Producing Solid Electrolytic Capacitor

The following describes an example of a method of producing the solid electrolytic capacitor of the present invention. Each step of the method is described. In the following example, a method of simultaneously producing multiple solid electrolytic capacitors by using a large electrode sheet is described.

(A) Preparing Electrode Sheet

In step (A), an electrode sheet including a dielectric layer on a surface is prepared.

Figure 6:
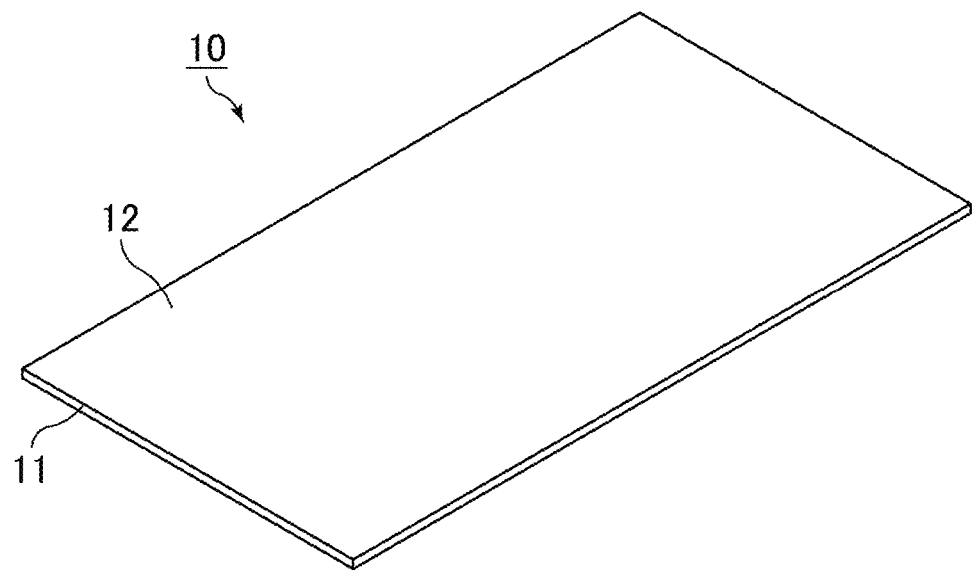
FIG. 6 is a schematic perspective view of an example of an electrode sheet.

FIG. 6 is a schematic perspective view of an example of the electrode sheet.

An electrode sheet 10 shown in FIG. 6 is made of the anode foil 11 including the dielectric layer 12 on a surface. The electrode sheet 10 is preferably produced as follows.

First, the anode foil 11 including a core portion and a porous portion on a surface of the core portion is prepared, and the dielectric layer 12 is formed on a surface of the porous portion.

In order to improve the production efficiency, a chemically treated foil that has been subjected to chemical treatment may be used as the anode foil 11 having the dielectric layer 12 on the surface.

(B) Forming Slits in Electrode Sheet

In step (B), slits are formed in the electrode sheet to separate a metal foil that defines cathode exposed portions from the anode foil.

Figure 7:
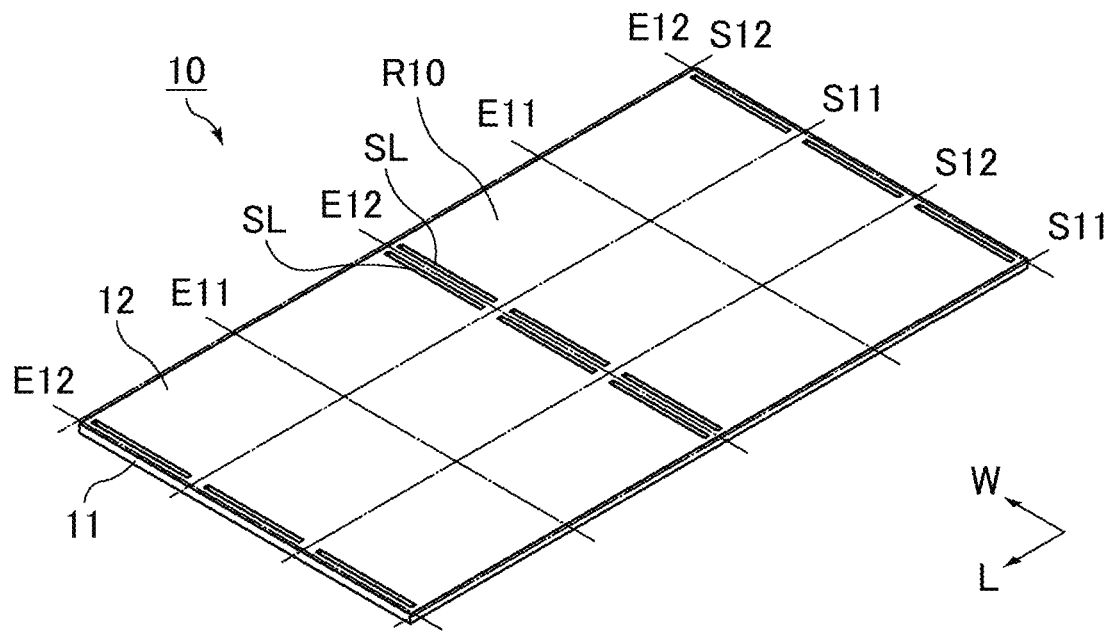
FIG. 7 is a schematic perspective view of an example of the electrode sheet including slits.

FIG. 7 is a schematic perspective view of an example of the electrode sheet including the slits.

FIG. 7 shows multiple capacitor element regions R10 in the electrode sheet 10. The capacitor element regions R10 are regions divided by first end portions E11 and second end portions E12 which are opposite to each other in the length direction L, and first lateral portions S11 and second lateral portions S12 which are opposite to each other in the width direction W. Each capacitor element region R10 shares the first end portion E11 or the second end portion E12 with its adjacent capacitor element region R10 in the length direction L. Each capacitor element region R10 shares the first lateral portion S11 or the second lateral portion S12 with its adjacent capacitor element region R10 in the width direction W.

As shown in FIG. 7, the slit SL is formed in each capacitor element region R10 of the electrode sheet 10. The slits SL are formed near the second end portions E12 and are parallel to the second end portions E12. The width of each slit SL (dimension in the L direction) is, for example, 30 μm to 150 μm. The length of each slit SL (dimension in the W direction) is smaller than its dimension in the W direction of the capacitor element region R10.

(C) Forming Mask Layer

In step (C), a mask layer is formed to cover the end portions and lateral portions of each capacitor element region in the electrode sheet. Step (C) is an optional step.

Figure 8:
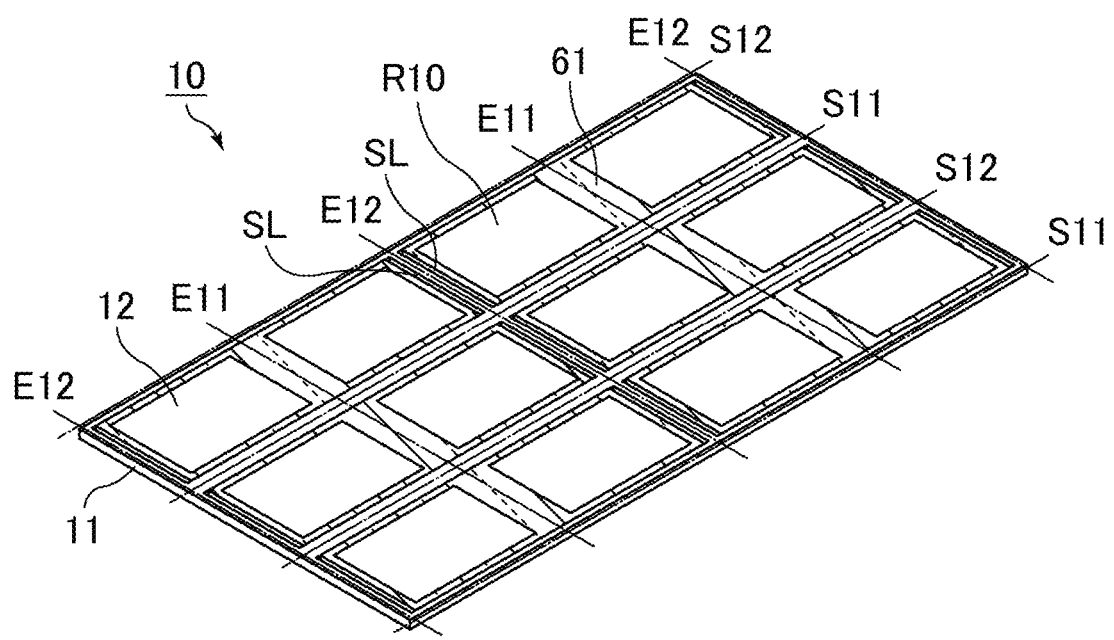
FIG. 8 is a schematic perspective view of an example of the electrode sheet including a mask layer.

FIG. 8 is a schematic perspective view of an example of the electrode sheet including a mask layer.

In the electrode sheet 10 shown in FIG. 8, the first end portion E11, the second end portion E12, the first lateral portion S11, and the second lateral portion S12 of each capacitor element region R10 are covered with the mask layer 61. In FIG. 8, some portions of the second end portion E12, the first lateral portion S11, and the second lateral portion S12 are not covered with the mask layer 61, but the mask layer 61 may be formed on these portions. The mask layer 61 may be formed on inner walls of the slits SL.

(D) Forming Insulating Portions

In step (D), insulating portions are formed by filling the slits with an insulating material.

Figure 9:
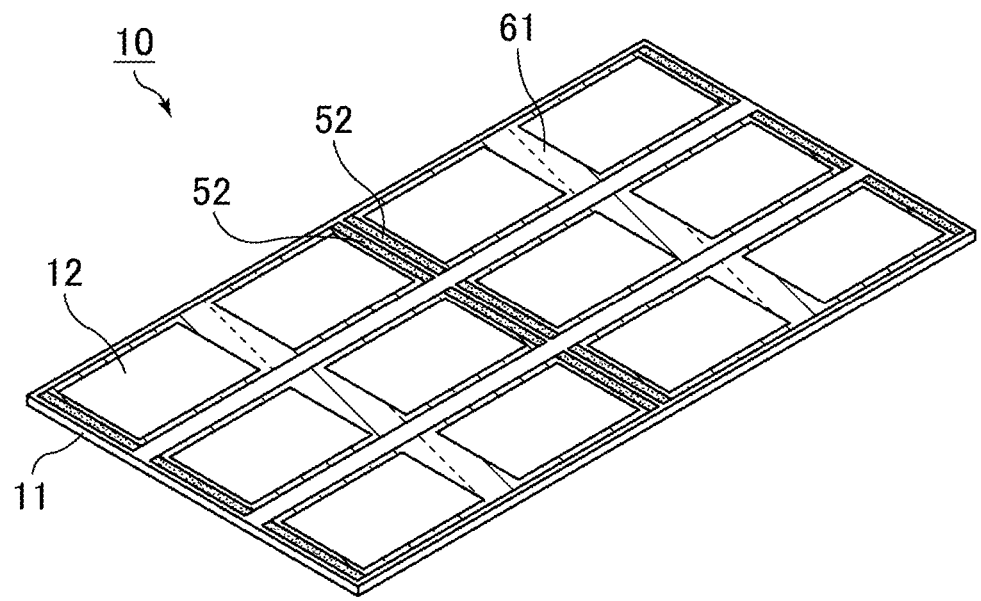
FIG. 9 is a schematic perspective view of an example of the electrode sheet including insulating portions.

FIG. 9 is a schematic perspective view of an example of the electrode sheet including the insulating portions.

In FIG. 9, the insulating portions 52 filling the slits SL are formed. The insulating portions 52 may be formed not only in the slits SL but may also be formed to extend on at least one of an upper surface or a lower surface of the electrode sheet 10. In this case, the insulating portions 52 may be connected to each other on the upper surface or the lower surface of the electrode sheet 10.

(E) Forming Cathode Layers

In step (E), a cathode layer is formed on a surface of each dielectric layer of the electrode sheet. In step (E), preferably, a solid electrolyte layer is first formed on the surface of each dielectric layer of the electrode sheet, and a carbon layer is then formed on a surface of each solid electrolyte layer.

Figure 10:
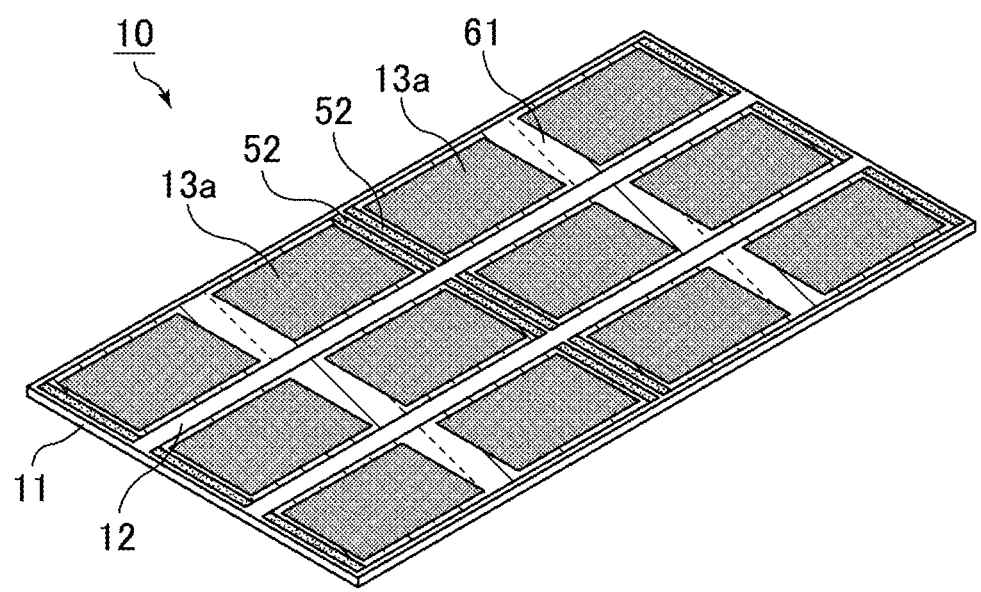
FIG. 10 is a schematic perspective view of an example of the electrode sheet including solid electrolyte layers.

FIG. 10 is a schematic perspective view of an example of the electrode sheet including the solid electrolyte layers.

In FIG. 10, each solid electrolyte layer 13a is formed in the region surrounded by the mask layer 61.

Figure 11:
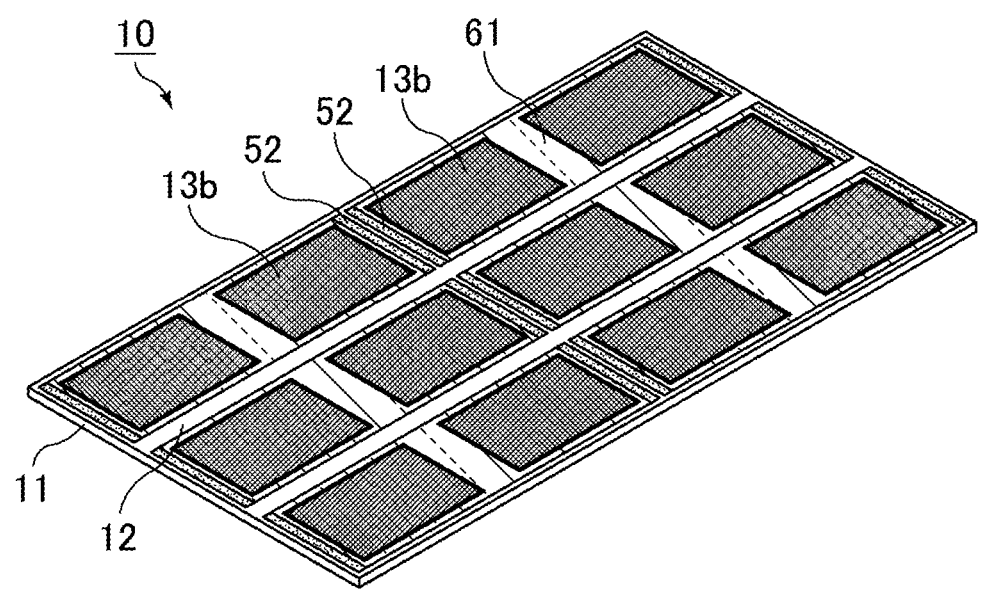
FIG. 11 is a schematic perspective view of an example of the electrode sheet including carbon layers.

FIG. 11 is a schematic perspective view of an example of the electrode sheet including the carbon layers.

In FIG. 11, the carbon layer 13b is formed on a surface of each solid electrolyte layer 13a. The solid electrolyte layer 13a and the carbon layer 13b together form the cathode layer 13 (see FIG. 2).

(F) Forming Insulating Adhesive Layers

In step (F), an insulating adhesive layer is formed. In the case where step (C) is performed, an insulating adhesive layer is formed on a surface of the mask layer. In the case where step (C) is not performed, an insulating adhesive layer is formed to cover the end portions and lateral portions of each capacitor element region in the electrode sheet. Step (F) is an optional step.

Figure 12:
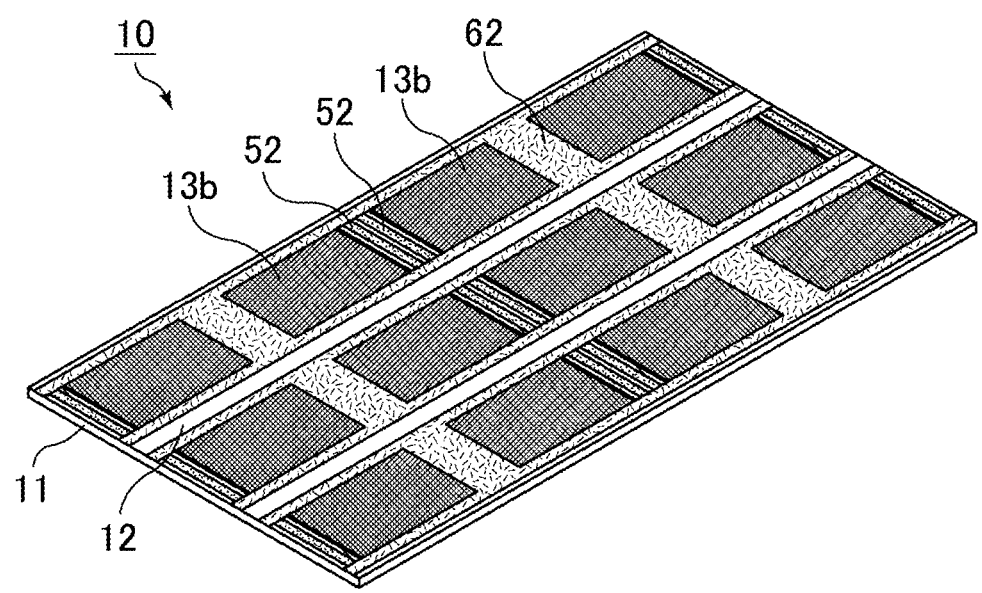
FIG. 12 is a schematic perspective view of an example of the electrode sheet including insulating adhesive layers.

FIG. 12 is a schematic perspective view of an example of the electrode sheet including the insulating adhesive layers.

In FIG. 12, the insulating adhesive layer 62 is formed on the surface of each mask layer 61. The mask layer 61 and the insulating adhesive layer 62 together form the insulating layer 60 (see FIG. 2).

The order of step (C), step (D), step (E), and step (F) is not limited.

The total thickness of the mask layer 61 and the insulating adhesive layer 62 may be the same as the thickness of the cathode layer 13, but is preferably greater than the thickness of the cathode layer 13.

(G) Forming Cathode Lead-Out Layers

In step (G), the cathode lead-out layers are formed by using a conductive paste. Specifically, the first cathode lead-out layer is formed on a surface of the cathode layer on the upper surface of the anode foil, and the second cathode lead-out layer is formed on a surface of the cathode layer on the lower surface of the anode foil.

Figure 13:
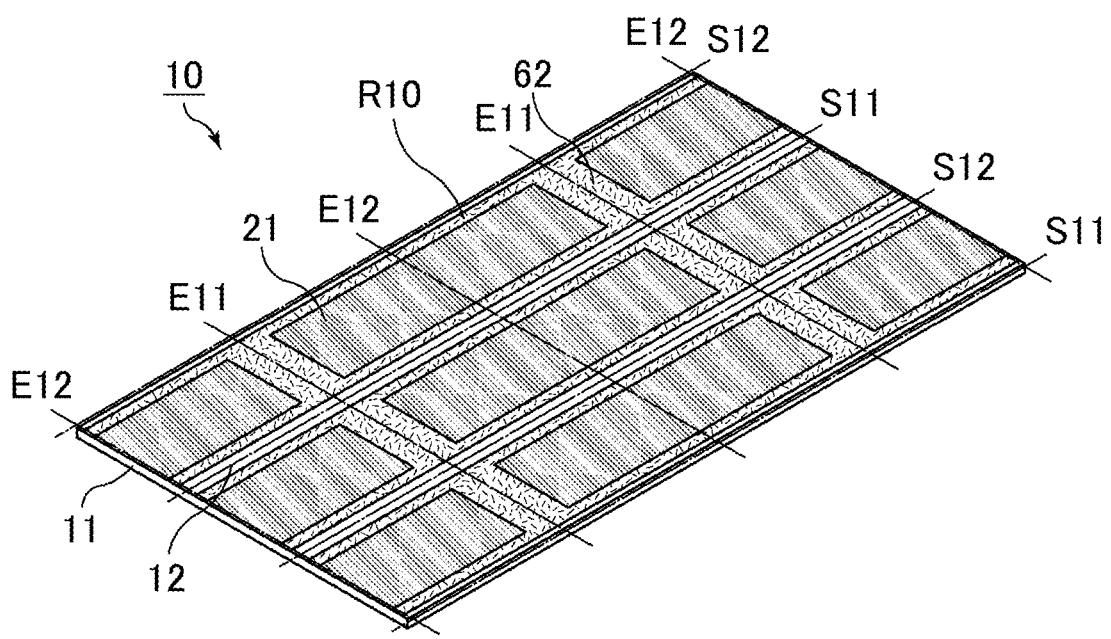
FIG. 13 is a schematic perspective view of an example the electrode sheet including cathode lead-out layers.

FIG. 13 is a schematic perspective view of an example of the electrode sheet including cathode lead-out layers.

In FIG. 13, on the upper surface of the anode foil 11, each first cathode lead-out layer 21 is formed to bridge the carbon layers 13b across the second end portion E12 of each capacitor element region R10. Although not shown, similarly on the lower surface of the anode foil 11, each second cathode lead-out layer 22 is formed to bridge the carbon layers 13b across the second end portion E12 of each capacitor element region R10. The cathode lead-out layers 120 (see FIG. 2) are thus formed.

(H) Stacking Electrode Sheets and Enclosing

In step (H), the electrode sheets including the cathode lead-out layers are stacked to produce an electrode sheet laminate which is then enclosed, whereby a multilayer block body is produced.

When stacking the electrode sheets, preferably, another electrode sheet is provided on one electrode sheet while the cathode lead-out layer is viscous and wet. In other words, preferably, the electrode sheets are stacked together after the cathode lead-out layers are formed by using a conductive paste, prior to drying the conductive paste.

When stacking the electrode sheets, the electrode sheets may be stacked on a support board such as a glass epoxy board.

The electrode sheet laminate can be enclosed by using the resin mold such as a compression mold described above.

A sealing material of the resin mold includes at least a resin, preferably a resin and a filler. Examples of the resin include epoxy resins and phenol resins. Examples of the filler include silica particles, alumina particles, and metal particles.

Figure 14:
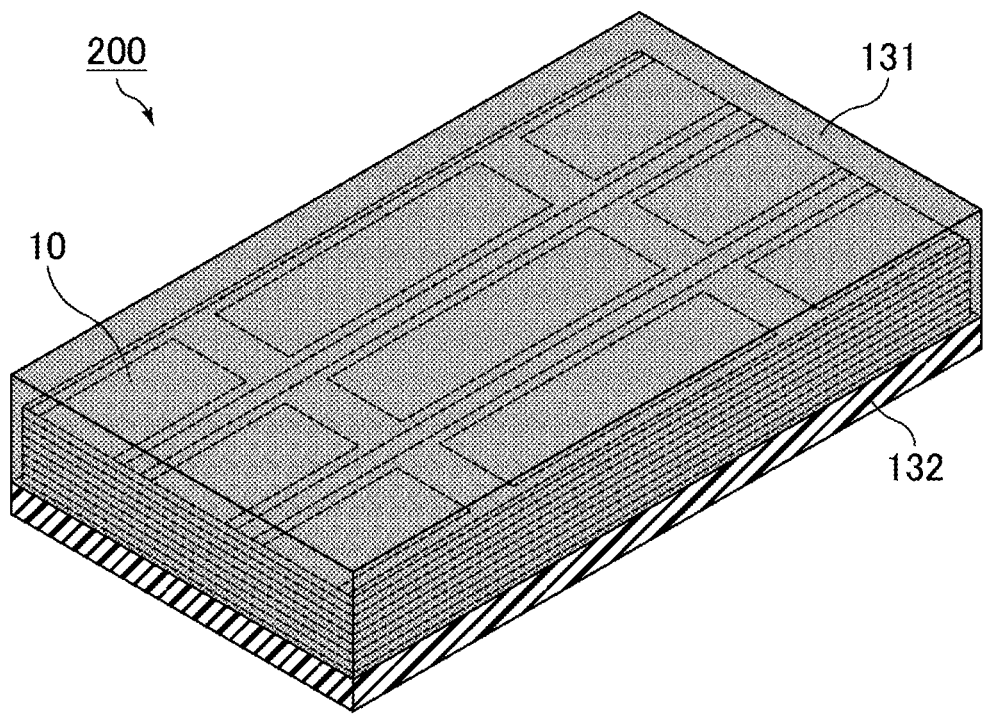
FIG. 14 is a schematic perspective view of an example of a multilayer block body.

FIG. 14 is a schematic perspective view of an example of the multilayer block body.

In a multilayer block body 200 shown in FIG. 14, the multiple electrode sheets 10 stacked on a support board 132 are covered with a sealing material 131.

(I) Cutting Multilayer Block Body to Produce Multiple Capacitor Element Laminates In step (I), the multilayer block body is cut to produce multiple capacitor element laminates.

The following describes an example of a method of producing multiple capacitor element laminates.

First, a multilayer block body is cut along a first lateral portion and a second lateral portion of each capacitor element region. The multilayer block body can be cut by, for example, dicing with a dicer.

Figure 15:
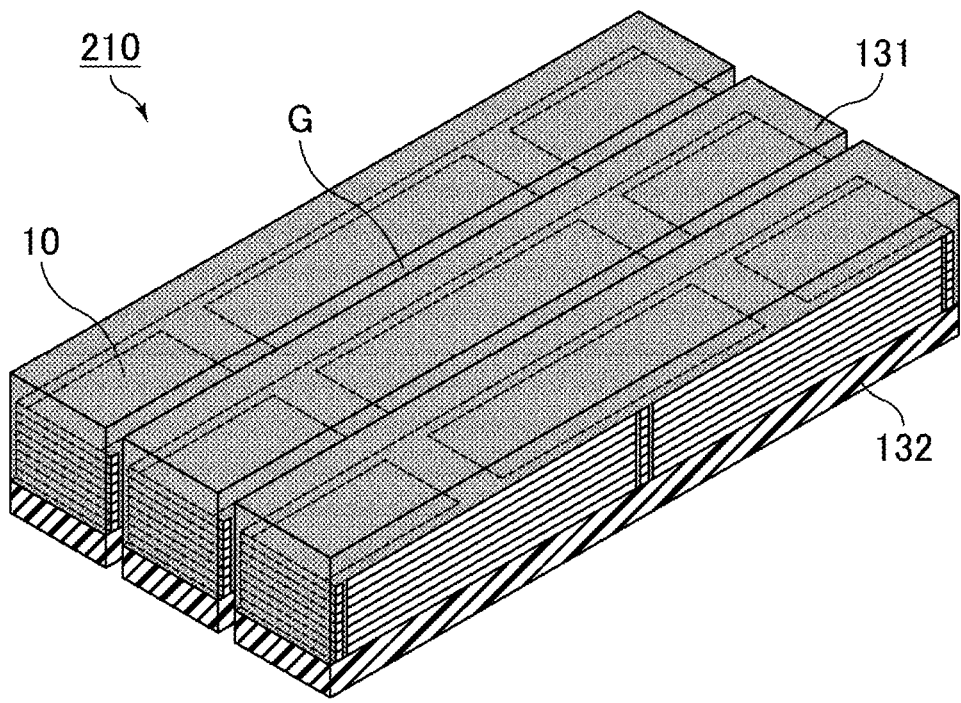
FIG. 15 is a schematic perspective view of an example of the multilayer block body after cutting.

FIG. 15 is a schematic perspective view of an example of the multilayer block body after cutting.

In FIG. 15, the multilayer block body 200 shown in FIG. 14 is cut along the first lateral portion and the second lateral portion of each capacitor element region to produce a multilayer block body 210 including gaps G along the first lateral portion and the second lateral portion.

Next, gaps in the multilayer block body are filled with a sealing material. The gaps can be filled with a sealing material by using the resin mold such as a compression mold described above. The sealing material can be, for example, a sealing material used to produce the multilayer block body.

Figure 16:
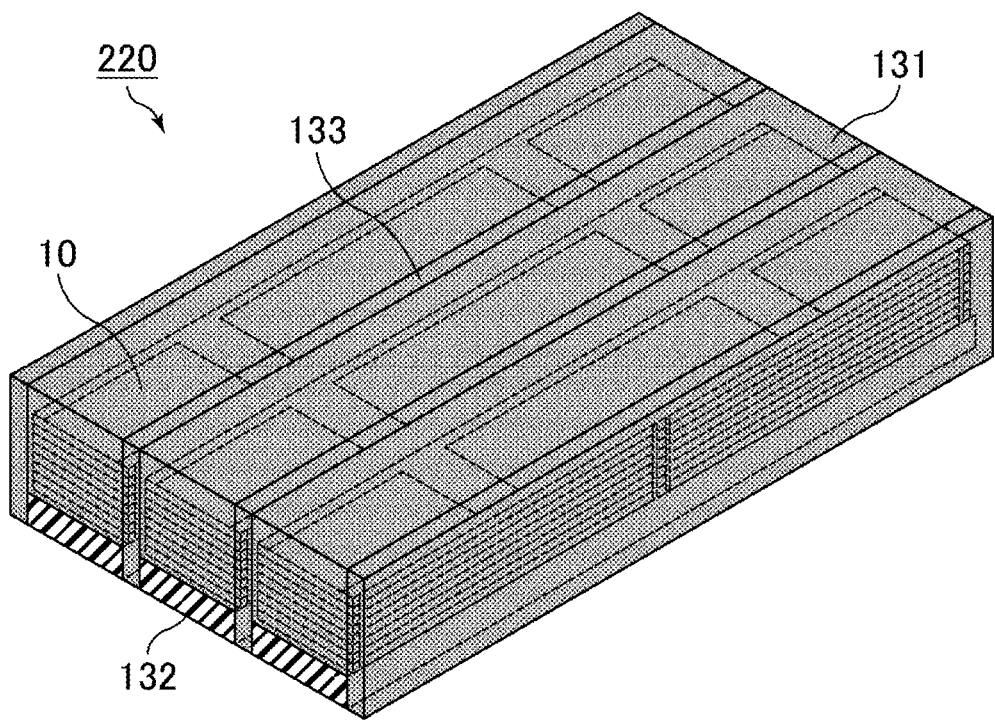
FIG. 16 is a schematic perspective view of an example of the multilayer block body in which gaps are filled with a sealing material.

FIG. 16 is a schematic perspective view of an example of the multilayer block body in which gaps are filled with a sealing material.

In FIG. 16, gaps G in the multilayer block body 210 shown in FIG. 15 are filled with a sealing material 133, whereby a multilayer block body 220 is produced.

Subsequently, the multilayer block body 220 is cut along the first end portion and the second end portion of each capacitor element region, and is also cut along the first lateral portion and the second lateral portion of each capacitor element region. Thereby, the individual capacitor element laminate 100 shown in FIG. 3 can be obtained. The multilayer block body 220 is cut by, for example, dicing with a dicer, cutting using a cutting blade, laser cutting, or scribing.

Figure 17:
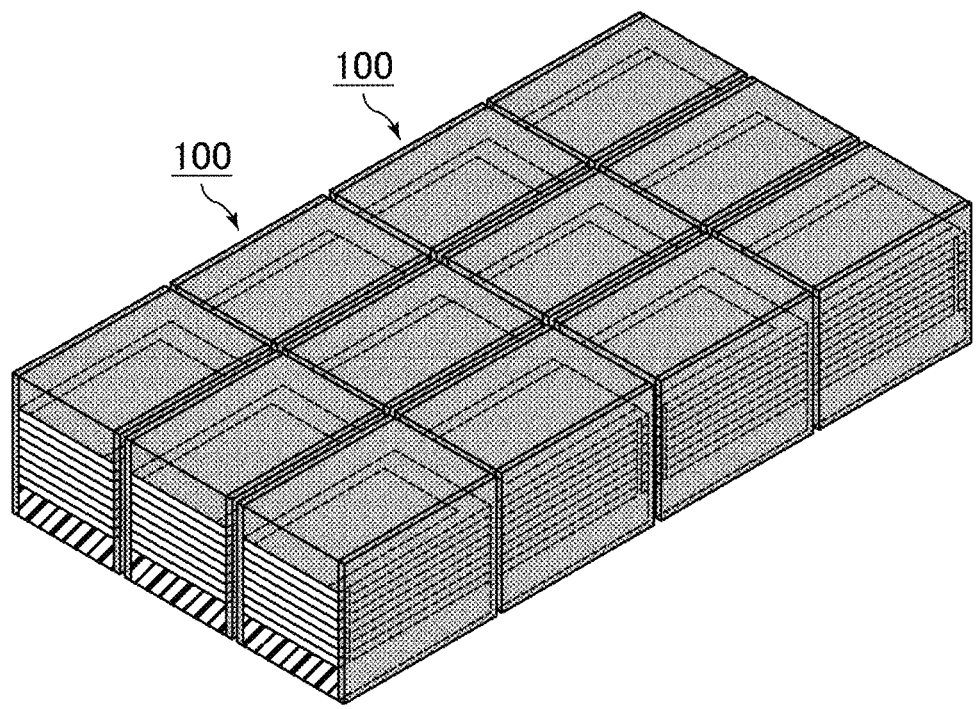
FIG. 17 is a schematic perspective view of an example of the capacitor element laminate cut into individual pieces.

FIG. 17 is a schematic perspective view of an example of the capacitor element laminate cut into individual pieces.

In FIG. 17, the multilayer block body 220 shown in FIG. 16 is cut to produce multiple capacitor element laminates 100.

The multilayer block body 220 is cut at a portion between the slits SL during cutting along the second end portion of each capacitor element region, whereby the capacitor element laminate 100 shown in FIG. 2 can be produced. The multilayer block body 220 may be cut on the slits SL, whereby the capacitor element laminate 100A shown in FIG. 5 can be produced.

(J) Forming External Electrodes

A first external electrode is formed at a first end surface of the capacitor element laminate, and a second external electrode is formed at a second end surface of the capacitor element laminate. A solid electrolytic capacitor is thus produced.

The solid electrolytic capacitor of the present invention is not limited to the above embodiments, and various modifications and changes can be made to the structure of the solid electrolytic capacitor, production conditions, and the like within the scope of the present invention.

The methods of producing the multilayer block body, cutting the multilayer block body, and forming the external electrodes to produce the solid electrolytic capacitor of the present invention are not limited. Any methods other than those described above may be used.

REFERENCE SIGNS LIST 1, 2 solid electrolytic capacitor
10 electrode sheet
11 anode foil
12 dielectric layer
13 cathode layer
13a solid electrolyte layer
13b carbon layer
21 first cathode lead-out layer
22 second cathode lead-out layer
31 resin molded body
32 support board 51 metal foil
52 insulating portion
53 insulating layer
60 insulating layer
61 mask layer
62 insulating adhesive layer
100, 100A capacitor element laminate
110 capacitor element
120 cathode lead-out layer
130 sealing body
131, 133 sealing material
132 support board
141 first external electrode
142 second external electrode
200, 210, 220 multilayer block body
E1 first end surface of capacitor element laminate
E2 second end surface of capacitor element laminate
G gap
M1 first main surface of capacitor element laminate
M2 second main surface of capacitor element laminate
S1 first lateral surface of capacitor element laminate
S2 second lateral surface of capacitor element laminate
R10 capacitor element region
E11 first end portion of capacitor element region
E12 second end portion of capacitor element region
S11 first lateral portion of capacitor element region
S12 second lateral portion of capacitor element region
SL slit
$W_{52}$ width of insulating portion

The invention claimed is:

1. A solid electrolytic capacitor comprising:
a capacitor element laminate having a first end surface and a second end surface, the capacitor element laminate having:
at least one capacitor element that includes an anode foil made of a valve-action metal and exposed at the first end surface of the capacitor element laminate, a first dielectric layer on a first surface of the anode foil, a second dielectric layer on a second surface of the anode foil opposite the first surface, a first cathode layer including a first solid electrolyte layer on the first dielectric layer, and a second cathode layer including a second solid electrolyte layer on the second dielectric layer,
a first cathode lead-out layer on an upper surface of the capacitor element, connected to the first cathode layer, and exposed at the second end surface of the capacitor element laminate; and
a second cathode lead-out layer on a lower surface of the capacitor element, connected to the second cathode layer, and exposed at the second end surface of the capacitor element laminate, wherein
the first cathode lead-out layer and the second cathode lead-out layer are both conductive paste layers, and uniformly extend from where the first cathode lead-out layer and the second cathode lead-out layer are disposed on connected to the first and second cathode layers, respectively, to the second external electrode, and
the first cathode lead-out layer and the second cathode lead-out layer exposed at the second end surface of the capacitor element laminate are insulated from the anode foil; and
a sealing body enclosing the at least one capacitor element and the first and second cathode lead-out layers;
a first external electrode connected to the anode foil that is exposed at the first end surface of the capacitor element laminate; and
a second external electrode connected to the first and second cathode lead-out layers that are exposed at the second end surface of the capacitor element laminate.

2. The solid electrolytic capacitor according to claim 1, wherein a metal foil exposed at the second end surface of the capacitor element laminate is in a space between the first cathode lead-out layer and the second cathode lead-out layer where the at least one capacitor element is not present, and
the metal foil is a portion separated from the anode foil by a slit, and is completely insulated from the anode foil.

3. The solid electrolytic capacitor according to claim 2, further comprising:
an insulating portion filling the slit between the metal foil and the anode foil.

4. The solid electrolytic capacitor according to claim 3, wherein the insulating portion extends to at least one of the first surface and the second surface of the anode foil.

5. The solid electrolytic capacitor according to claim 4, further comprising:
an insulating layer between the at least one of the first surface and the second surface of the anode foil and the insulating portion extending to the at least one of the first surface and the second surface of the anode foil.

6. The solid electrolytic capacitor according to claim 1, wherein the sealing body includes a resin molded body.

7. The solid electrolytic capacitor according to claim 6, wherein the sealing body further includes a support board.

8. The solid electrolytic capacitor according to claim 6, further comprising:
an insulating layer in a space between the first cathode lead-out layer and the second cathode lead-out layer where the at least one capacitor element is not present, wherein the insulating layer and the resin molded body are made of different insulating materials.

9. The solid electrolytic capacitor according to claim 6, further comprising:
an insulating layer in a space between the first cathode lead-out layer and the second cathode lead-out layer where the at least one capacitor element is not present, wherein the insulating layer and the resin molded body are made of the same insulating material.

10. The solid electrolytic capacitor according to claim 1, wherein the first solid electrolyte layer is on a surface of the first dielectric layer, the second solid electrolyte layer is on a surface of the second dielectric layer, the first cathode layer further includes a first carbon layer on a surface of the first solid electrolyte layer, and the second cathode layer further includes a second carbon layer on a surface of the second solid electrolyte layer.

11. The solid electrolytic capacitor according to claim 1, wherein the anode foil is made of a valve-action metal selected from aluminum, tantalum, niobium, titanium, zirconium, and alloys thereof.

12. The solid electrolytic capacitor according to claim 1, wherein the conductive paste layers contain silver, copper, or nickel.

13. The solid electrolytic capacitor according to claim 1, wherein the conductive paste layers have a thickness of 2 μm to 20 μm.

* * * * *